March 9, 1948.　　　L. C. HUFFORD　　　2,437,604
DECOY
Filed Jan. 7, 1946
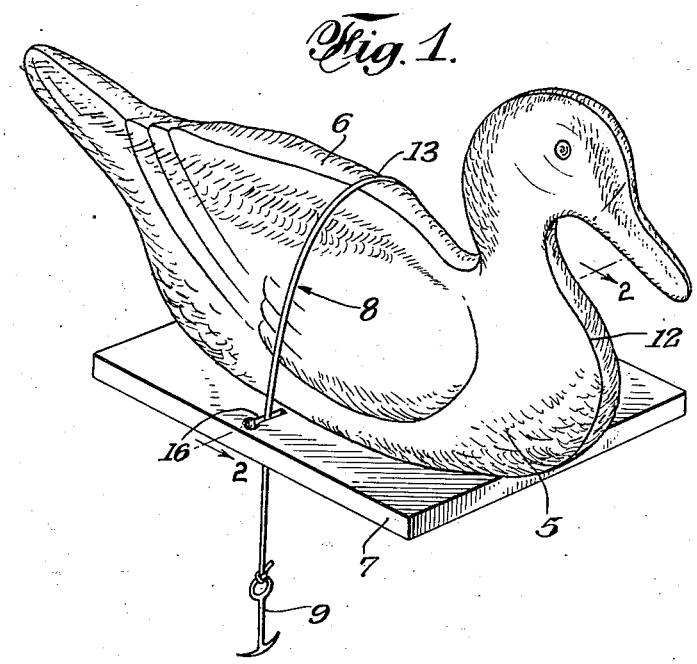
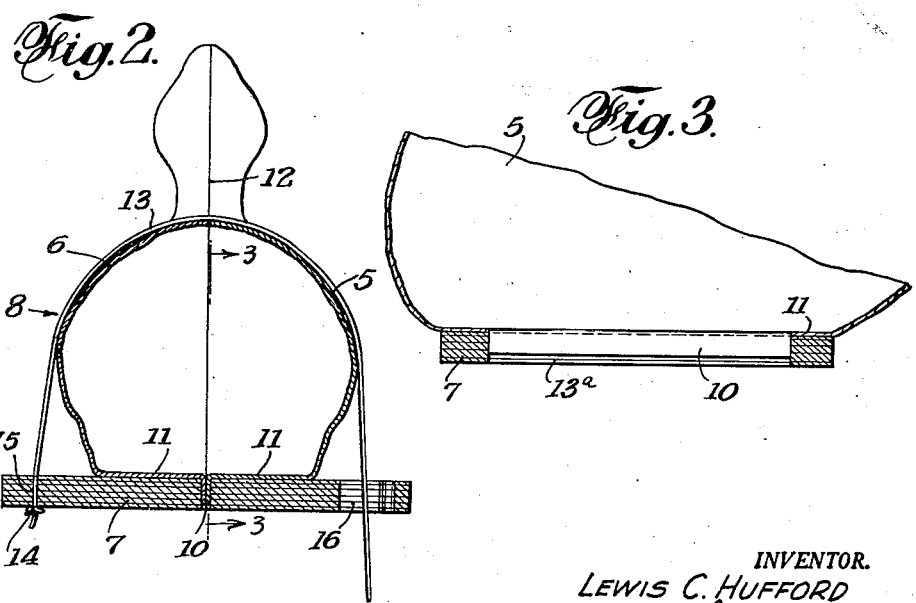
INVENTOR.
LEWIS C. HUFFORD
BY C. G. Stratton
ATTORNEY Patented Mar. 9, 1948

2,437,604

UNITED STATES PATENT OFFICE 2,437,604

DECOY

Lewis C. Hufford, Manhattan Beach, Calif.

Application January 7, 1946, Serial No. 639,559

3 Claims. (Cl. 43—3)

This invention relates to decoys as used by hunters of wild game birds and has for its primary object to provide a sectional structure, which assembled, comprises a decoy and, when disassembled, is easily and compactly stored and carried.

Decoys, especially wild duck decoys, are usually formed of wood or papier-mâché decorated and marked to resemble natural ducks. While effective, such decoys offer a transporting problem to hunters since several of them occupy considerable space frequently needed for other important items.

Another object of the invention is to provide a decoy comprising sections or components which are adapted to be nested or stacked so that several decoys can be stored in a space not appreciably larger than that occupied by a decoy of conventional form and construction.

Another object of the invention is to provide a decoy which comprises sections adapted to be quickly and easily assembled for use and as easily dis-assembled.

Another object of the invention is to provide a sectional decoy having novel means for both retaining the assembly and for anchoring the decoy to float naturally upon water.

My invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes one embodiment of the present invention, which is given by way of illustration or example only.

In the drawings, like reference characters designate similar parts in the several views.

Fig. 1 is a perspective view of a decoy embodying the present invention.

Fig. 2 is a transverse cross-sectional view thereof as taken on line 2—2 of Fig. 1.

Fig. 3 is a fragmentary longitudinal sectional view on the plane of line 3—3 of Fig. 2.

The decoy of the present invention comprises, generally, similar opposed mating sections 5 and 6, a base 7, supporting said sections, means 8 for holding the sections assembled, and means 9 for anchoring the decoy.

The sections 5 and 6 comprise preferably stamped light metal elements, each formed and decorated to resemble one-half of a duck or like bird, and designed so that when mated in side-to-side relation, a replica of a natural duck is obtained. Each section is, therefore, a hollow element whereby several such sections may be nested for compactness when being transported.

According to the present invention, each section 5 and 6 is formed with a down-reaching flange 10 arranged longitudinally along the bottom of each section, said flange of each section being bent from a bottom wall 11. By placing a right and left section 5 and 6 to form a central seam along a parting line 12, a decoy duck is formed having a bottom comprising the walls 11 and a central longitudinal fin comprising the flanges 10.

The base 7 may be variously formed. As shown, said base comprises a rectangular ply-wood buoyant member having a longitudinal slot 13a adapted to receive the fin formed by the flanges 10. The mated sections 5 and 6 are firmly held in place on the base 7 by resting the walls 11 on the top surface of the base as best seen in Fig. 2.

Although the above-described decoy structure is generally complete and will serve as an efficient buoyant decoy, means are provided for obviating separation of the sections 5 and 6 along the parting line 12. In the present instance, the means 8 is provided, said means comprising a string, cord or wire 13 trained across the mated sections as seen in Figs. 1 and 2. In the present case, the cord 13 is knotted at 14, passed through a hole 15 in one side of the base 7, trained across the sections 5 and 6, and passed through a slot 16 in the opposite side of the base. The cord 13 is extended beneath the base and connected to the anchor 9.

The assembly of the components of the decoy is obvious. With the cord 13 either slackened or with the anchor end thereof pulled through the slot 16, the mated sections 5 and 6 are assembled on the base 7 and the cord arranged as shown with the anchor 9 hanging beneath the base. When placed upon water, the decoy will float with the base so submerged by the light but sufficient weight of the sections 5 and 6 that it will not be seen. The anchor 9 may either snag on the bottom of shallow water or merely serve as a weighted point about which the decoy will drift. In either case, the decoy will move in a natural bird-luring manner on the surface of the water.

While I have illustrated and described what I now regard as the preferred embodiment of my invention, the construction is, of course, subject to modifications without departing from the spirit and scope of my invention. I, therefore, do not wish to restrict myself to the particular form of construction illustrated and described, but desire to avail myself of all modifications that may fall within the scope of the appended claims.

Having thus described my invention, what I claim and desire to secure by Letters Patent is:

1. A decoy comprising opposed mating sections, a buoyant base member mounting said sections, and means both holding said sections together and serving to anchor the decoy, said latter means comprising a cord trained over said sections, a connection for the cord at one side of the base, and an anchor on the free end of the cord and beneath said base.

2. A decoy comprising a buoyant base having a longitudinal slot therein, opposed hollow mating sections each having a downreaching flange along the bottom and said flanges being contiguous and residing in said slot, and flexible means trained over said mating sections and connected to said base on one side of the latter to hold together the portions of said sections opposite to the mentioned flanges.

3. A decoy comprising a buoyant base having a longitudinal slot therein, opposed hollow mating sections each having a downreaching flange along the bottom and said flanges being contiguous and residing in said slot, flexible means trained over said mating sections and connected to said base on one side of the latter to hold together the portions of said sections opposite to the mentioned flanges, said latter means comprising a cord that extends freely through said base on the other side of the mating sections, and an anchor on the end of said cord and beneath the base.

LEWIS C. HUFFORD.

REFERENCES CITED

The following references are of record in the file of this patent:

UNITED STATES PATENTS

| Number | Name | Date |
|---|---|---|
| 470,564 | Henderson et al. | Mar. 8, 1892 |
| 477,084 | Thorn | June 14, 1892 |
| 1,484,975 | Stubbs | Feb. 26, 1924 |